Patented May 10, 1932

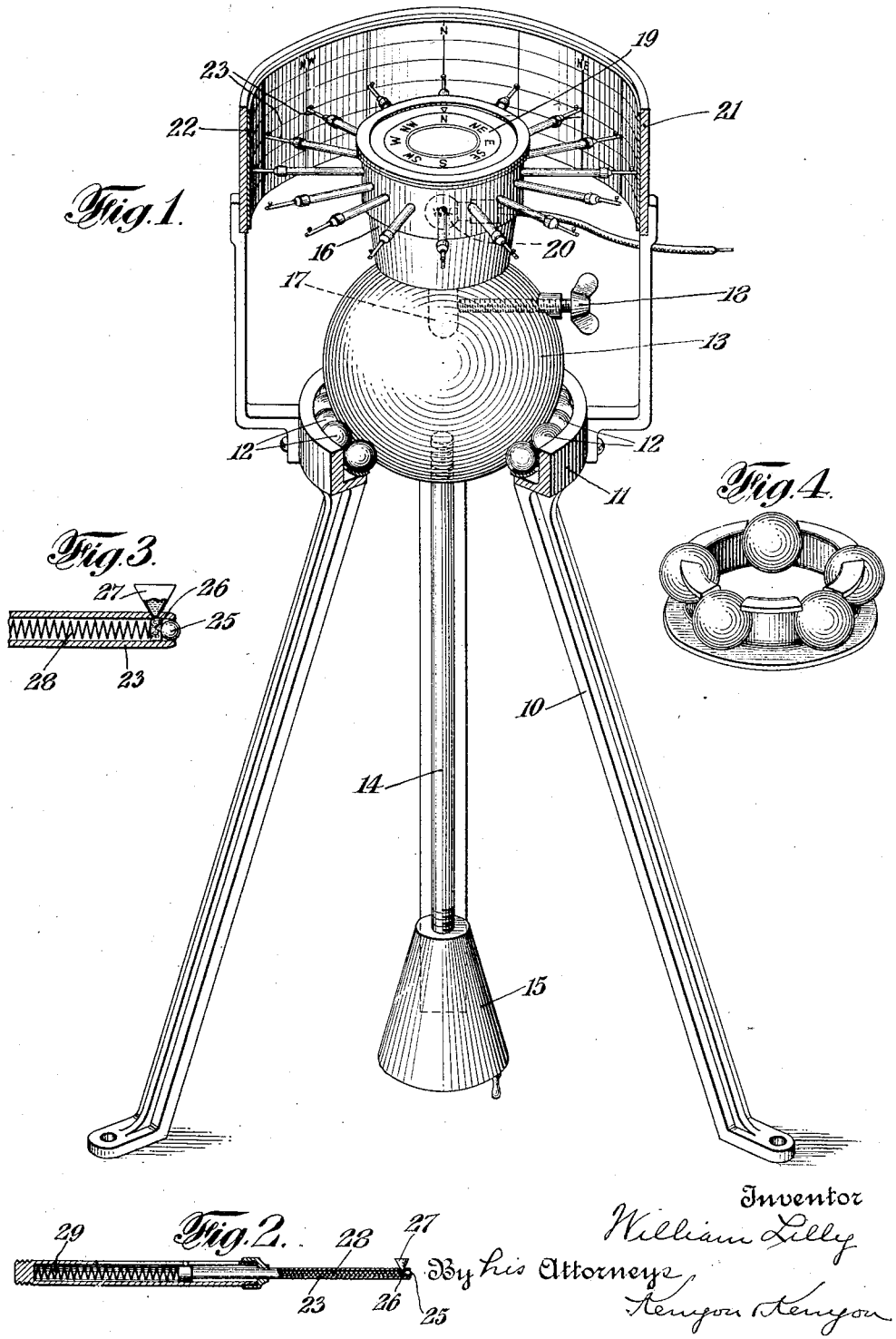

1,857,597

UNITED STATES PATENT OFFICE

WILLIAM LILLY, OF NEW YORK, N. Y.

NAUTICAL INSTRUMENT

Application filed January 4, 1928. Serial No. 244,387.

This invention relates to self-adjusting supports and more especially to supports for use in connection with nautical instruments. It is important that nautical instruments, such as the compass and the like be maintained horizontal despite the pitching or rolling of the ship. It is also desirable to note and record the extent of roll or pitch of the ship.

An object of this invention is an apparatus for supporting a nautical instrument such as a compass in such manner that it is maintained horizontal at all times. A further object of the invention is an apparatus for indicating and recording the roll and pitch of the ship. These two objects may be embodied in a single device.

According to this invention a sphere is supported by means of a circle of balls of smaller diameter than the sphere. The balls are mounted upon a support which rests upon the deck of a ship. A rigid pendulum has one end attached to the sphere and extends through the circle of balls. A compass or other instrument is mounted on the sphere diametrically opposite the pendulum. Thus when the ship rolls or pitches or both pitches and rolls the pendulum exerts movement of force on the sphere tending to hold the latter in such position that the pendulum is vertical. Thus although there is relative movement of the sphere and the balls supporting the same the compass and the other instrument mounted on the sphere remains horizontal.

The compass may be provided with a plurality of telescoping arms carrying marking means at their ends. A cylinder of paper or the like may enclose the compass and be so arranged as to be engaged by the marking means. Relative movement of the cylinder and compass causes the marking means to produce up and down lines on the cylinder, thus registering the roll or pitch of the ship. As the sphere is free to move in all directions an accurate record of the ship's motion may be obtained. Other objects, novel features, and advantages of the invention will be apparent from the following description and accompanying drawings, wherein Fig. 1 is a perspective view partially in section of an apparatus embodying the invention;

Fig. 2 is a sectional view of one of the telescoping arms, and

Fig. 3 is an enlarged detail view of the marking means.

Fig. 4 is a perspective of a modified arrangement of the sphere supporting balls.

10 represents a standard which is adapted to stand on the deck of a ship and be permanently attached thereto. At the upper end of the standard 10 is provided a circular recess 11 in which is mounted a series of balls 12, these balls being of the type used in antifriction bearing. A sphere 13 rests upon the balls 12 and is capable of universal movement. A pendulum 14 has one end fastened to the sphere 13 and carries at its other end a weight 15 which is adjustable lengthwise of the pendulum. A support 16 is mounted on the sphere 13 by means of a stud 17 which extends into a socket in the sphere 13. The sockets into which the stud 17 and pendulum 14 project are diametrically opposite each other. A set screw 18 is provided for clamping the stud 17 in the sphere. The compass 19 is carried by the support 16 and may be of any well known type of compass. An electric lamp 20 is arranged below the compass 19 in the event that the compass is of the type having a ground glass bottom.

The device above described supports the compass and maintains the same in substantially horizontal position at all times. The pendulum 14 tends to remain vertical despite the roll or pitch of the ship and as the axis of the compass is parallel to the pendulum the compass itself is maintained substantially horizontal at all times. Friction may be reduced to a minimum and the advantages of universal movement retained by utilizing five balls mounted in a race, as shown in Fig. 4. The use of five balls while advantageous because of the reduction in friction is not essential to the invention.

Means are also provided for recording the roll or pitch of the ship. This means may comprise a cylindrical shell 21 supported by the standard 20 and enclosing the compass, on the inner surface of which is provided a cylinder 22 of paper or the like or the shell itself may be composed of a transparent substance such as celluloid, glass or the like. A plurality of telescoping arms 23 carried by the compass 19 extend radially therefrom. In the outer end of each arm is rotatably mounted a small ball 25 and is engaged by an ink pad 26. An ink reservoir 27 is carried by each arm and conveys ink to the pad 26. A spring 28 maintains the ink pad 26 in contact with ball 25 and a spring 29 presses the movable part of the telescoping arm outwardly so as to maintain the ball 25 in contact with the paper cylinder 23 at all times. Thus upon relative movement of the sphere 13 and its support there is produced relative movement of the arms 23 and the shell 21. As a result balls 25 trace lines on the paper cylinder 22 thus indicating the roll or the pitch of the ship. Because of the fact that the sphere 13 is mounted for universal movement and there are provided a plurality of arms 23 an accurate indication is obtained of the movement of the ship whether it be a pitch or a roll, or a combination of both. Although two springs 28 and 29 have been used, it is apparent that a single spring might be used both to maintain the ink pad 26 in contact with the ball 25 and to press the movable section of the telescoping arm outwardly.

The shell 21 is of transparent material and the cylinder 22 may be provided with vertical lines as shown indicating the points of the compass and with horizontal circles indicating degrees of roll, these linings being arranged below or above a zero circle which indicates the position when the ship is at rest. By means of these lines an accurate indication may be obtained of the extent and direction of the movement of the ship. In the event that the shell 21 is made of transparent material the ink reservoirs 27 may be omitted or the ink drained therefrom. This will permit observation of the arms through the transparent matter without tracing any record on the cylinder.

Although the invention has been described in connection with nautical instruments, it is apparent that the support may be utilized in connection with various other instruments or devices. For example, it may be utilized as a support for a telescope, a bed, a chair, an operating table or platform or as a support for machine or other types of guns mounted on ships, motor trucks or railway carriages. In fact it may be made use of wherever it is desirable to maintain an instrument, device or apparatus in a predetermined position regardless of the motion of the structure upon which it is mounted. It is of course apparent that various structural modifications may be made without in any way departing from the spirit of the invention as defined in the appended claims.

I claim:
1. An apparatus of the character described comprising a sphere, an annular member supporting said sphere, a pendulum suspended from said sphere, means for supporting a cylinder of paper or the like around said sphere and self-adjusting marking members supported by said sphere and having their ends engaging said cylinder.

2. An apparatus of the character described comprising a standard annular row of balls supported thereby, a sphere resting on said balls, a pendulum suspended from said sphere, a compass carried by said sphere, means for supporting a cylinder of paper or the like, and marking members carried by said compass and engaging said cylinder.

In testimony whereof, I have signed my name to this specification.

WILLIAM LILLY.